United States Patent
Lang et al.

(10) Patent No.: US 7,574,287 B2
(45) Date of Patent: Aug. 11, 2009

(54) SYSTEM FOR TRANSMITTING SIGNALS IN A MOTOR VEHICLE

(75) Inventors: Heinrich Lang, Ergersheim (DE); Stephan Plomp, Berkel-Enschot (NL)

(73) Assignee: Lang Mekra North America, LLC, Ridgeway, SC (US)

( * ) Notice: Subject to any disclaimer, the term of this patent is extended or adjusted under 35 U.S.C. 154(b) by 497 days.

(21) Appl. No.: 11/232,578

(22) Filed: Sep. 22, 2005

(65) Prior Publication Data

US 2006/0064208 A1     Mar. 23, 2006

(30) Foreign Application Priority Data

Sep. 22, 2004    (DE)    ................ 10 2004 045 974

(51) Int. Cl.
*B60T 8/60*   (2006.01)
(52) U.S. Cl. .......................... 701/1; 340/431
(58) Field of Classification Search ............ 701/1, 701/36, 29; 340/825.52, 431; 73/116
See application file for complete search history.

(56) References Cited

U.S. PATENT DOCUMENTS

| | | | | |
|---|---|---|---|---|
| 4,505,347 | A * | 3/1985 | Prechtel ................... | 180/14.2 |
| 5,142,278 | A * | 8/1992 | Moallemi et al. ........... | 340/436 |
| 5,457,629 | A * | 10/1995 | Miller et al. .................... | 701/1 |
| 5,539,657 | A * | 7/1996 | Utsumi et al. ................ | 725/75 |
| 6,243,685 | B1 * | 6/2001 | Welch et al. ................. | 704/276 |
| 6,592,230 | B2 * | 7/2003 | Dupay ........................ | 359/839 |
| 6,655,197 | B2 * | 12/2003 | Wallace ..................... | 73/118.1 |
| 6,799,814 | B2 * | 10/2004 | Lesesky et al. ......... | 303/122.02 |
| 7,195,381 | B2 * | 3/2007 | Lynam et al. ............... | 362/494 |
| 7,355,629 | B2 * | 4/2008 | Lang et al. ................. | 348/148 |
| 2005/0073433 | A1 * | 4/2005 | Gunderson et al. .......... | 340/903 |
| 2006/0157239 | A1 * | 7/2006 | Ramos et al. ............ | 166/254.2 |

FOREIGN PATENT DOCUMENTS

| | | |
|---|---|---|
| DE | 41 11 223 A1 | 10/1992 |
| DE | 197 03 144 C2 | 12/1999 |

(Continued)

OTHER PUBLICATIONS

German Search Report, Jun. 13, 2005.

(Continued)

*Primary Examiner*—Dalena Tran
(74) *Attorney, Agent, or Firm*—McNair Law Firm, P.A.; Hunter S. Freeman

(57) ABSTRACT

The invention is a system for transmitting signals in a vehicle, comprising a sensor that generates sensor signals, an information display device that receives the sensor signals and a transmission conduit through which the sensor signals are transmitted. The transmission conduit comprises transmission line that may be dedicated for purposes other than transmitting the sensor signals, modulator, demodulator and control device. When the sensor is actuated, the control device acts to detect the presence of current in the transmission line and if present, actuates the modulator thus, modulating the sensor signals prior to their transmission via the transmission line. Simultaneously, the control device actuates the demodulator for demodulating the modulated sensor signals prior to their transmission to the information display device. If, however, current is not detected in the transmission line when the sensor is actuated, the sensor signals are transmitted via the transmission line without being modulated or demodulated.

21 Claims, 2 Drawing Sheets

FOREIGN PATENT DOCUMENTS

| | | |
|---|---|---|
| DE | 100 21 573 A1 | 11/2001 |
| DE | 101 30 544 A1 | 1/2003 |
| DE | 102 34 483 A1 | 2/2004 |
| EP | 1 273 478 A2 | 8/2003 |
| EP | 1 273 478 A3 | 7/2004 |

OTHER PUBLICATIONS

Power Line Vision Systems, A New View: The Power Line Concept.

* cited by examiner

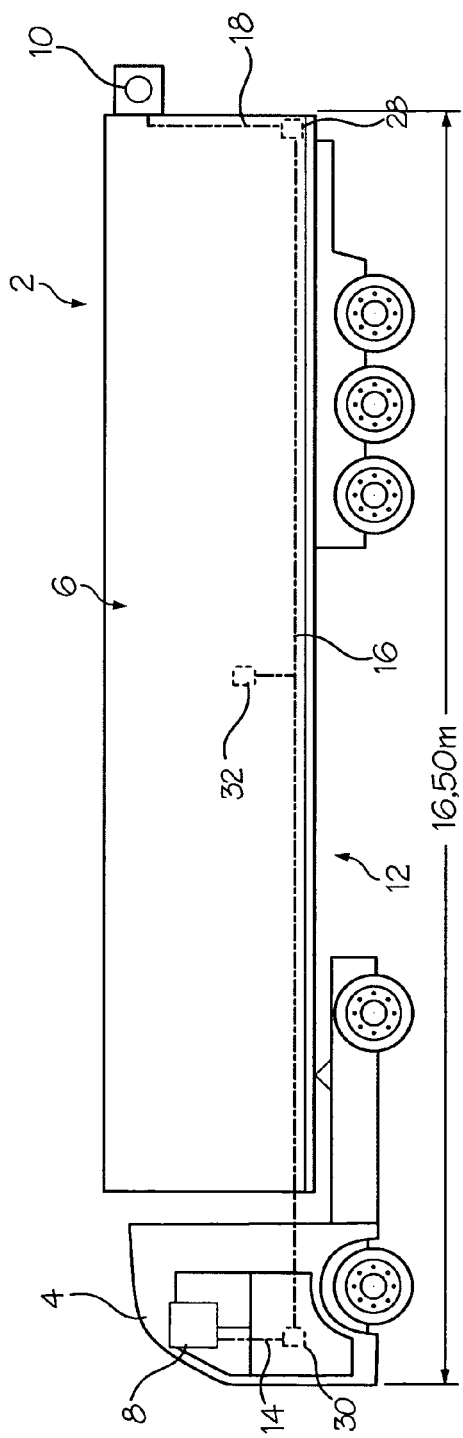
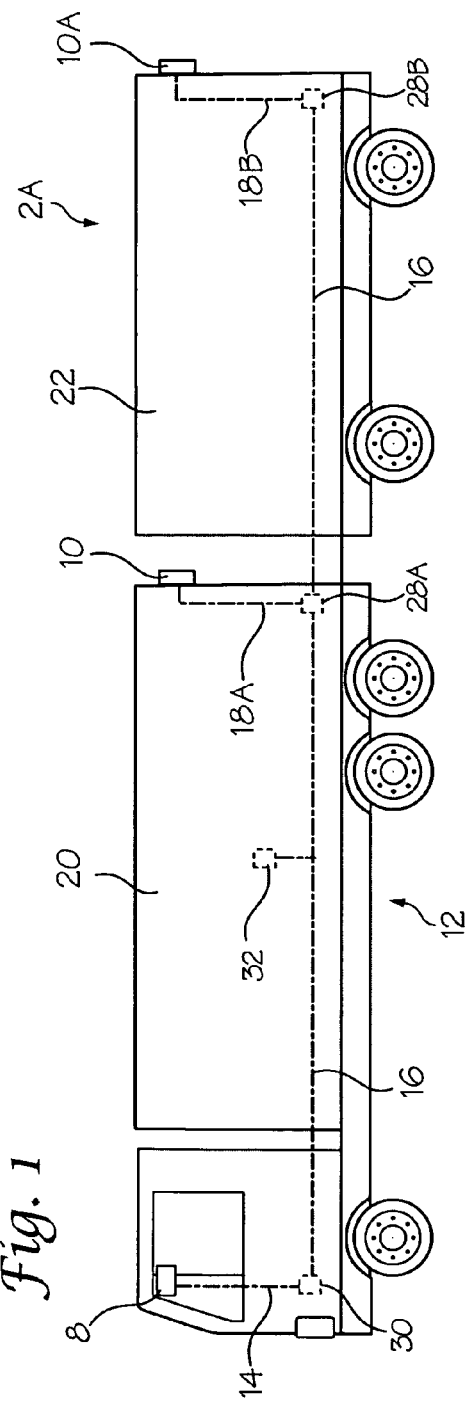

SYSTEM FOR TRANSMITTING SIGNALS IN A MOTOR VEHICLE

FIELD OF THE INVENTION

The present invention relates to a system for transmitting sensor signals from a sensor to a receiver in a motor vehicle, in particular, commercial motor vehicles. Specifically, the invention is directed towards a system of transmitting sensor signals from a sensor to a receiver using pre-existing transmission lines in a motor vehicle that are designated for purposes other than transmitting the sensor signals from the sensor to the receiver.

BACKGROUND OF THE INVENTION

Sensor systems or camera systems are often used for monitoring areas relative to large commercial motor vehicles that are difficult or impossible for the driver of the vehicle to see, commonly known as blind spots. In the simplest case, a distance sensor is used for detecting the distance from the tail of the vehicle to the ramp. Typically, when approaching a ramp, the sensor transmits information regarding the distance to a receiver located in the driver cabin of the motor vehicle, which is then output on a display, providing the driver with a visual or auditory aid while reversing the vehicle.

Applicant's German Patent Application, System zur Ubertragung von Signalen in einem Kraftfahrzeug discloses the use of a video camera located on the tail of a motor vehicle for monitoring the rear areas of the vehicle. The image produced by the video camera is displayed on a monitor, enabling the driver of the vehicle to approach loading ramps in reverse, while recognizing, in real time, any obstacles behind the vehicle.

Typically, the system described in that application transmits the image signals from the camera via continuous wires generally made of copper, or also via fiber optic cable that are designated solely for the transmission of the signals generated by the camera. The installation of such additional signal wires, however, is time and cost intensive. Retrofitting vehicles with the wires necessary to transmit the camera signals is extremely difficult and can often only be realized at a high technical cost.

Further increasing the time and cost intensive nature of installing or retrofitting commercial vehicles with the additional signal wires is the fact that when dealing with commercial vehicles having a tractor and a trailer, it is essential that the trailer be detachable from the tractor towing it. Therefore, with respect to the signal wires running between the tractor and trailer, it must be possible to disconnect those signal wires.

In order to avoid this disadvantage, EP 1 273 478 proposes a wireless transmission of the image signals of the camera via radio signals. Control signals for the camera, such as swiveling, focusing, changing views, etc., can also be transmitted without wire. In such a transmission, however, other radio signals may interfere with the image created by the camera and/or control signals.

Often times, when two vehicles equipped with such a transmission system travel next to each other, such as during simultaneous approach of adjoining ramps for loading or unloading, the images displayed on the respective monitors of the two vehicles become distorted or are displayed on the wrong respective monitor, i.e. the image of a first vehicle is transmitted on the monitor of a second vehicle and visa versa.

It is therefore the object of the present invention to provide a system for transmitting signals in a motor vehicle that is flexible and insensitive to interference and can be easily retrofitted.

SUMMARY OF THE INVENTION

The above objectives are accomplished according to the present invention by providing a system for transmitting sensor signals from a detection device to a receiver in a motor vehicle comprising a sensor carried by the motor vehicle for sensing information regarding the motor vehicle and generating sensor signals representing the information. An information display device is located in the driver cabin of the motor vehicle and is used for receiving the sensor signals and outputting the information represented by those signals. A transmission conduit is used for transmitting the sensor signals from the sensor to the information display device. The transmission conduit includes a transmission line designated for purposes other than transmitting the sensor signals, thus allowing the transmission of the sensor signals through a pre-existing transmission line in the motor vehicle.

The transmission conduit further includes a signal modulator interconnecting the sensor and the transmission line for generating modulated sensor signals by modulating the sensor signals. A signal demodulator interconnects the transmission line and the information display device and is used for demodulating the modulated sensor signals. A control device interconnects the signal modulator and signal demodulator. When current is present in the transmission line, the control device acts to actuate the signal modulator to modulate the sensor signals and to actuate the signal demodulator to demodulate the modulated sensor signals, allowing the sensor signals to be transmitted via the transmission line simultaneously with the current.

The transmission line in the transmission conduit may comprise free current carrying wire or fiber optic cable. It may also be the line designated for powering and controlling the vehicle's lighting system.

The information display device may be a graphical interface unit or other means of outputting the information received from the sensor optically and/or acoustically.

The sensor may be a distance sensor for determining a distance between the motor vehicle and an object as well as a light sensitive sensor in a video camera where the sensor signal is a video signal so that it senses and monitors blind spots. The sensor may also act to detect vehicle state magnitudes. Further the sensor can be removably mounted by a quick mounting means.

The transmission conduit comprises a sensor for sensing information regarding the motor vehicle and generating sensor signals. A signal modulator is used for creating modulated sensor signals by modulating the sensor signals. A signal demodulator is used for demodulating the modulated sensor signals. A plurality of transmission lines that may be free current carrying lines or fiber optic cable interconnect the signal modulator and signal demodulator. An information display device is connected to the signal demodulator for receiving and outputting the information represented by the sensor signals. A control device is disposed between the signal modulator and the signal demodulator and connected to each of the plurality of transmission lines.

The control device detects current in the plurality of transmission lines and upon detecting the current, the control device actuates the signal modulator to modulate the sensor signals prior to being transmitted through the plurality of transmission lines and actuates the signal demodulator to demodulate the modulated sensor signals prior to being transmitted from the plurality of transmission lines to the information display device, thus allowing the signals to be transmitted through the individual lines simultaneously with the current.

The sensor may be automatically actuated when the motor vehicle is in reverse or may be manually actuated by the user.

The transmission conduit also includes a filter for suppressing interference with the sensor signals.

The transmission conduit includes a sensor carried by one of the tractor or trailer of a motor vehicle having a tractor and a trailer attached to the tractor.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1 is a diagrammatic side view illustrating an illustration of a first embodiment of a system for transmitting signals in a motor vehicle;

FIG. 2 is a diagrammatic side view illustrating a second embodiment of a system for transmitting signals in a motor vehicle.

DESCRIPTION OF A PREFERRED EMBODIMENT

Figure 3:
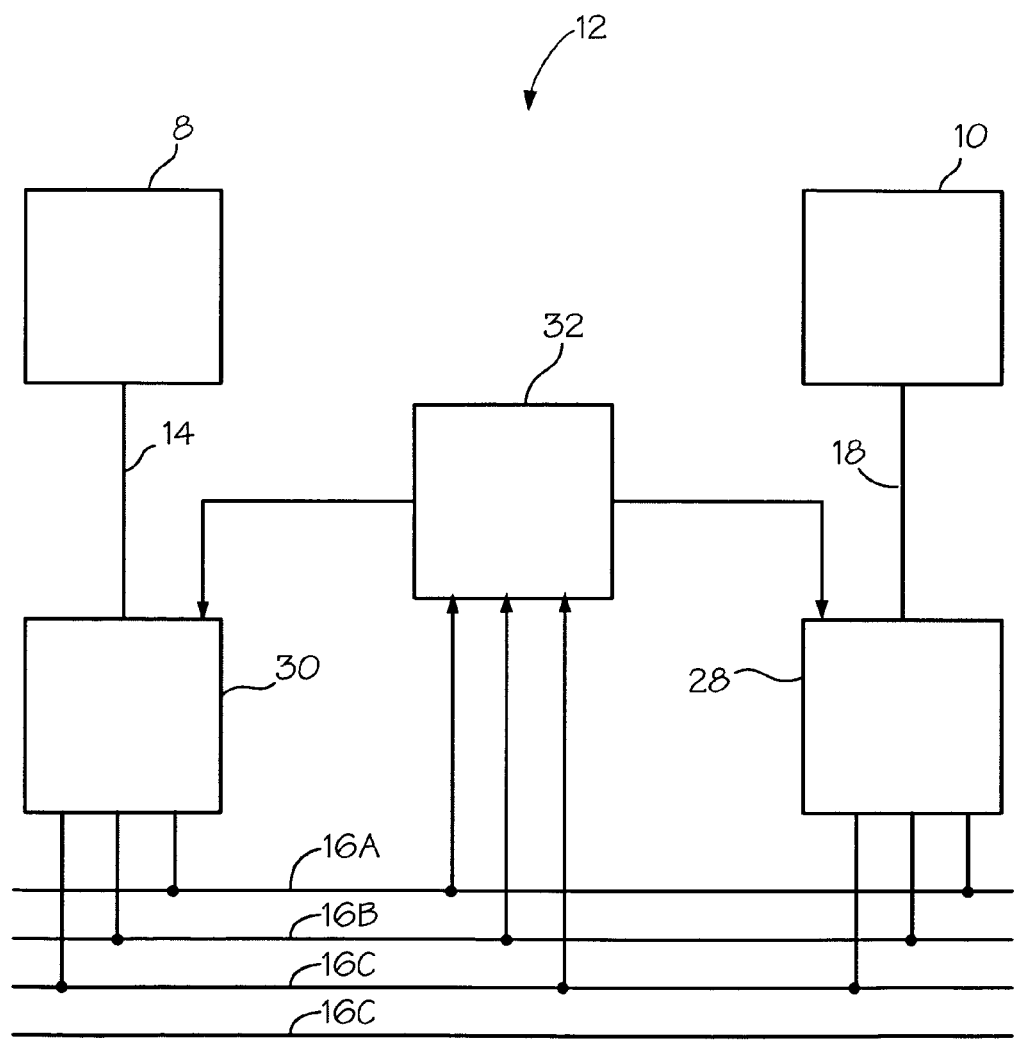
FIG. 3 is a schematic diagram of a portion of the transmission conduit included in the system for transmitting signals in a motor vehicle.

Referring now in more detail to the drawings, the invention will now be described in more detail.

Referring now to FIG. 1, the invention is shown in use on commercial motor vehicle 2, having a tractor 4 and a trailer 6. The invention comprises a sensor 10 and a information display device 8. When used on commercial vehicles such as the one illustrated, the sensor is mounted on the rear of the trailer and the information display device is installed in the driver's cabin of the vehicle.

The invention further comprises a transmission conduit, generally shown at 12, that interconnects the sensor to the information display device 8. Transmission conduit 12 includes an information display device section 14, a sensor section 18 and a transmission line 16 interconnecting the two sections.

Transmission line 16 interconnects the information display section 8 and the sensor section 18 and is preferably a previously installed, current carrying line comprising conventional copper or fiber optic cable. The transmission line need not be specifically dedicated to the transmission of the sensor signals generated by sensor 10. In fact, transmission line 16 may be a reserved transmission line, dedicated for other purposes such as powering and/or controlling the brake lights, turn signals, headlights or other power consuming item installed at the rear of trailer 6. The use of such a previous existing transmission line alleviates the need to install additional transmission lines in the vehicle that are dedicated specifically for the transmission of signals from the sensor to the information display device.

The transmission conduit's sensor section 18 connects sensor 10 to transmission line 16 and the information display device section 14 connects information display device 8 to transmission line 16. Both the sensor section and information display device section may comprise conventional copper wire or fiber optic cable.

Referring now to FIG. 3, transmission conduit 12 further includes a signal modulator 28 and a signal demodulator 30. Signal modulator 28 is disposed between sensor 10 and transmission line 16 and connects sensor section 18 to transmission line 16. Signal demodulator 30 is disposed between information display device 8 and transmission line 16 and connects transmission line 16 to information display device section 14. The signal modulator and signal demodulator may be conventional or opto-coupler type systems, depending on whether transmission line 16, sensor section 18 and display device section 14 comprise conventional copper wire or fiber optic cable.

Transmission conduit 12 also includes a control device 32 that is connected to signal modulator 28, signal demodulator 30 and transmission line 16. Since transmission line 16 is not specifically dedicated to the transmission of the sensor signals generated by sensor 10 and may in fact be reserved for alternate purposes, control device 32 acts to detect whether current or other signal is being carried by transmission line 16. If current or other signal is detected in transmission line 16, control device 32 actuates signal modulator 28 and signal demodulator 30 to allow for the alteration of the sensor signals transmitted so that the modulated sensor signals can be transmitted with said current without interference. If, however, no current or signal is detected in transmission line 16, the sensor signals are allowed to be transmitted through transmission line 16 without alteration.

If actuated by control device 32, signal modulator 28, upon receiving sensor signals generated by sensor 10 via sensor section 18, acts to generated modulated sensor signals by altering the amplitude, frequency, phase or intensity of the sensor signals. This change allows the modulated sensor signals to be transmitted via transmission line 16 simultaneously with the current or other signal being carried by transmission line 16 without encountering interference from the current or other signal present in transmission line 16. Signal demodulator 30 is actuated by control device 32 simultaneously with the actuation of the signal modulator 30. Therefore, upon reaching signal demodulator 30, the modulated sensor signals are demodulated back to their original frequency and transmitted to the information display device via information display device section 14. This ensures that the information received by information display device 8 is not distorted.

While signal modulator 28 and signal demodulator 30 act to prevent interference encountered by the sensor signals during transmission, interference caused by operation of the vehicle's engine, on board electronics or outside equipment cannot be entirely avoided. Therefore, transmission conduit 12 includes at least one filter to suppress interference signals as much as possible.

In at least one embodiment, transmission line 16 comprises at least two transmission lines. Sensor 10 is connected to the input of signal modulator 28 by the sensor section. A first end of each transmission line is connected to the output of the signal modulator 28. A second end of each transmission line is connected to the input of signal demodulator 30. Information display device 8 is connected to the output of signal demodulator 30 via the information display device section 14. The advantage of having transmission line 16 comprise at least two transmission lines is that if one of the transmission lines is defective so that no sensor signal reaches the information display device, the transmission of the sensor signals can be switched to a different transmission line.

In this embodiment, control device 32, is connected to each of the individual transmission lines 16 and acts to detect whether current or other signal is present in any of the individual transmission lines. If current or other signal is present in any of the individual transmission lines, the control device 32 actuates the signal modulator 28 to generate modulated sensor signals and signal demodulator 30 to demodulate the modulated sensor signals during transmission. Otherwise, the sensor signals are allowed to pass through the individual transmission lines unaltered.

While FIG. 3 shows the signal modulator as a separate unit disposed between sensor 10 and transmission line 16, the signal modulator 28 may be a component piece of the sensor 10 itself. Similarly, signal demodulator 30 may be a component piece of the information display device 8 rather than the separate unit as shown.

In at least one embodiment, one or more sensors are distance sensors for determining the distance between the vehicle and an obstacle. In this embodiment, the sensor(s) should be mounted on the rear of the vehicle or the rear of the vehicle's trailer to facilitate shunting or reverse travel in general. In the event more than one sensor is used, one or more of the sensors may be mounted to the side of the vehicle or vehicle's trailer. Such position of the sensor(s) allows the driver of the vehicle to effectively see around the corner in real time when in reverse travel.

In alternate embodiments, the sensor could be a light sensitive sensor installed in a video camera that generates video signals. In this embodiment, the sensor monitors areas in proximity of the vehicle that are difficult or impossible for the driver to see. These areas are commonly known as blind spots. Therefore, this sensor would allow the driver to see what is behind the vehicle while the sensor is actuated.

In an alternate embodiment, the sensor could comprise at least one distance sensor and at least one light sensor in a video camera that transmits sensor signals to the information display device, which outputs a real time video image with a visual or auditory indication of the distance between the vehicle and an obstacle.

In another embodiment, the sensor could be one that detects vehicle state magnitudes such as tire pressure, the proper operation of equipment or any other information regarding the operation of the vehicle itself. This embodiment could easily be combined with any of the above embodiments of the invention.

In any of the above described embodiments, the transmission of the sensor signals may be actuated automatically when the vehicle is placed in reverse and/or manually actuated through the use of a switch or other actuating means generally known in the art. Further, in any of the above embodiments, the sensor may be attached to the vehicle by a quick mounting device. Suitable quick mounting devices may include bayonet, snap on connectors, magnetic holders, screw connectors or any other quick mounting devices generally known in the art.

In any of the above embodiments, information display device 8 may be a monitor, LCD, graphical user interface or other suitable device for the display of the information sensed by the sensor.

As is shown in FIG. 2, the invention is not limited by the number of trailers that are connected to the vehicle. FIG. 2 shows the invention being used on a commercial vehicle 2A having an elongated tractor 20 and a trailer 22. When trailer 22 is not connected to tractor 20, the sensor can be mounted to the rear of the tractor, at 10. If, however, trailer 22 is attached to the rear of tractor 20, the sensor can be placed at the rear of the trailer, at 10a. As is true in FIG. 1, in order for the invention to work on this type of set up, trailer 22 must be equipped with transmission line 16 and sensor section 18. Further, if a second trailer were to be attached to the trailer 22, the sensor could be attached to the rear of that trailer. As long as the trailer(s) to be attached to the vehicle are equipped with transmission line 16 and sensor section 18, the number of trailers attached to the tractor is inconsequential to the operation of the invention.

While a preferred embodiment of the invention has been described using specific terms, such description is for illustrative purposes only, and it is to be understood that changes and variations may be made without departing from the spirit or scope of the following claims.

What is claimed is:

1. A system for transmitting sensor signals from a detection device to a receiver in a motor vehicle comprising:
    a sensor carried by said motor vehicle for sensing information regarding said motor vehicle and generating said sensor signals representing said information;
    an information display device located in a driver cabin of said motor vehicle for receiving said sensor signals and outputting said information represented by said sensor signals; and
    a transmission conduit for transmitting said sensor signals from said sensor to said information display device, said transmission conduit including an existing vehicle signal transmission line designated for transmitting vehicle reverse light actuating signals to the reverse light system of the vehicle;
    a signal modulator interconnecting said sensor and said pre-existing transmission line for creating modulated sensor signals by modulating said sensor signals for transmission over said pre-existing transmission line;
    a signal demodulator interconnecting said pre-existing transmission line and said information display device for demodulating said modulated sensor signals for display on said display device; and
    a signal modulation control device interconnecting said modulator and signal demodulator; wherein said signal modulation control device only actuates said signal modulator to modulate said sensor signals and said signal demodulator to demodulate said modulated sensor signals when said vehicle reverse light actuating signal is present in said pre-existing transmission line so that said sensor signals are transmitted via said pre-existing transmission line simultaneously with said vehicle reverse light actuating signal.

2. The system of claim 1, wherein said transmission line comprises free current carrying wire.

3. The system of claim 1, wherein said transmission line comprises fiber optic cable.

4. The system of claim 1, wherein the information display device is a graphical interface unit.

5. The system of claim 4, wherein said information display device outputs said information optically.

6. The system of claim 4, wherein said information display device outputs said information acoustically.

7. The system of claim 4, wherein said information display device outputs said information acoustically and optically.

8. The system of claim 1, wherein said sensor is removably mounted to said motor vehicle by a quick mounting device.

9. The system of claim 1, wherein said sensor is a distance sensor for determining a distance between said motor vehicle and an object.

10. The system of claim 1, wherein said sensor is a light sensitive sensor in a video camera and said sensor signal is a video signal.

11. The system of claim 10, wherein said sensor senses blind spots.

12. The system of claim 10, wherein said pre-existing transmission line is coupled with said video camera so that said video camera is actuated simultaneously with the vehicle reverse light system by said vehicle reverse light actuating signal.

13. The system of claim 1, wherein said sensor acts to detect vehicle state magnitudes.

14. A transmission conduit for transmitting sensor signals in a motor vehicle comprising:
- a sensor for sensing information regarding said motor vehicle and generating sensor signals representing said information;
- a signal modulator for creating modulated sensor signals by modulating said sensor signals for transmission over said transmission conduit;
- a signal demodulator for demodulating said modulated sensor signals for display on said display device;
- a transmission line interconnecting said signal modulator and said signal demodulator, wherein said transmission line is designated for transmitting signals other than said sensor signals;
- an information display device connected to said signal demodulator for receiving and outputting said information represented by said sensor signals;
- a signal modulation control device disposed between said signal modulator and said signal demodulator and connected to said transmission line; whereby said signal modulation control device detects current in said transmission line and upon detecting said current, said signal modulation control device actuates said signal modulator to modulate said sensor signals prior to being transmitted through said transmission line and to actuate said signal demodulator to demodulate said modulated sensor signals prior to being transmitted from said transmission line to said information display device, allowing said signals to be transmitted through said transmission line simultaneously with said current.

15. The transmission conduit of claim 14, wherein said sensor is actuated when said motor vehicle is in reverse.

16. The transmission conduit of claim 14, wherein said sensor is manually actuated.

17. The transmission conduit of claim 14, further comprising a filter for suppressing interference with said sensor signals.

18. The transmission conduit of claim 14, wherein said transmission line comprises free current carrying wire.

19. The transmission conduit of claim 14, wherein said transmission line comprises fiber optic cable.

20. The transmission conduit of claim 14, wherein said motor vehicle comprises a tractor and a trailer attached to said tractor.

21. The transmission conduit of claim 20, wherein said sensor is carried by one of said tractor and said trailer.

* * * * *